(12) United States Patent
Rudeen et al.

(10) Patent No.: US 6,188,500 B1
(45) Date of Patent: Feb. 13, 2001

(54) METHOD FOR GENERATING MULTIPLE SCAN LINES IN A THIN SCANNER

(75) Inventors: Robert W. Rudeen, Eugene; James W. Ring, Blodgett; Mohan L. Bobba, Tigard, all of OR (US)

(73) Assignee: PSC Scanning, Inc., Eugene, OR (US)

( * ) Notice: Under 35 U.S.C. 154(b), the term of this patent shall be extended for 0 days.

(21) Appl. No.: 09/280,156

(22) Filed: Mar. 26, 1999

(Under 37 CFR 1.47)

Related U.S. Application Data

(60) Provisional application No. 60/080,684, filed on Apr. 3, 1998.

(51) Int. Cl.[7] .................................................. G02B 26/08
(52) U.S. Cl. ........................... 359/196; 359/204; 359/205; 235/462.32; 235/462.4
(58) Field of Search ..................................... 359/196, 197, 359/204, 205, 212, 214, 216, 217, 218, 219, 234, 636; 235/462.32, 462.33, 462.35, 462.36, 462.37, 462.38, 462.39, 462.4

(56) References Cited

U.S. PATENT DOCUMENTS

| 4,799,164 | * | 1/1989 | Hellekson et al. ................. 235/462.4 |
| 4,861,973 | * | 8/1989 | Hellekson et al. ................. 235/462.4 |
| 5,268,565 | | 12/1993 | Katoh et al. .......................... 235/467 |
| 5,325,381 | * | 6/1994 | Paoli ...................................... 372/24 |
| 5,705,802 | * | 1/1998 | Bobba et al. .................... 235/462.39 |
| 5,744,815 | * | 4/1998 | Gurevich et al. .................... 250/566 |
| 5,815,300 | * | 9/1998 | Ohkawa et al. ..................... 359/196 |
| 5,892,214 | * | 4/1999 | Lindacher et al. .............. 235/462.32 |

FOREIGN PATENT DOCUMENTS

WO 90/01715   2/1990   (WO).

* cited by examiner

*Primary Examiner*—Darren Schuberg
(74) *Attorney, Agent, or Firm*—Lyon & Lyon LLP

(57) ABSTRACT

A method of and system for generating multiple parallel scan lines, for a thin, narrow height scanner by generating a reading beam, using a suitable scanning mechanism to scan or dither the reading beam, directing the scanned beam onto an optical element, controlling the system such that the beam is alternately transmitted or reflected by the optical element, and directing multiple scan lines into the scan volume. When the optical element is reflective, a scan line is produced directly off the optical element; when the optical element is transmissive, a scan line passes through the optical element and is reflected by a fold mirror and into the scan volume.

22 Claims, 4 Drawing Sheets

METHOD FOR GENERATING MULTIPLE SCAN LINES IN A THIN SCANNER

RELATED APPLICATION DATA

This application is a continuing application of Ser. No. 60/080,684 filed Apr. 3, 1998.

BACKGROUND OF THE INVENTION

The field of the present invention relates to scan line generation for scanners. In particular, a method and apparatus is described herein for generating multiple scan lines in a thin scanner such as used for barcode scanning.

Traditional fixed scanners generate parallel scan lines by use of a spinning facet wheel, also called a polygon mirror, having a plurality of facet mirrors arranged at different tilt angles. FIG. 1 illustrates such a configuration 10 having a polygon mirror 12 having multiple mirror facets. A reading beam generated from for example a laser diode (not shown) is directed onto the polygon mirror 12 which as it rotates creates a scan line via each facet mirror. The scan lines 14 and 16 are reflected by facets onto a fold mirror 18 thereby projecting parallel scan lines into the scan volume. This configuration requires downstream pattern mirror(s) to have a larger height to intercept these lines and fold them into a scan pattern of parallel lines.

Another method commonly employed for rapidly and repetitively scanning the illumination beam across a scanned region is mirror dithering. Dithering, i.e. rapid oscillation, of an illumination beam steering mirror about an axis substantially parallel to the mirror face causes the illumination beam to move rapidly back and forth thereby forming a scan line. Generally a dithering mirror can only produce a single scan line. In either method, when a scan line illuminates a barcode, the resulting time dependent signal due to detected light scattered and/or reflected from the bars and spaces of the barcode is decoded to extract the information encoded therein.

SUMMARY OF THE INVENTION

The present invention is directed to a method of generating multiple scan lines, particularly parallel scan lines. In its preferred embodiment, the method comprises generating a reading beam, using a suitable scanning mechanism to scan or dither the reading beam, directing the scanned beam onto an optical element, controlling the system such that the beam is alternately transmitted or reflected by the optical element, and directing multiple scan lines into the scan volume. When the optical element is reflective, a scan line is produced directly off the optical element; when the optical element is transmissive, a scan line passes through the optical element and is reflected by a fold mirror and into the scan volume.

DETAILED DESCRIPTION OF THE PREFERRED EMBODIMENTS

Preferred embodiments of the present invention will now be described with reference to the drawings.

Figure 2:
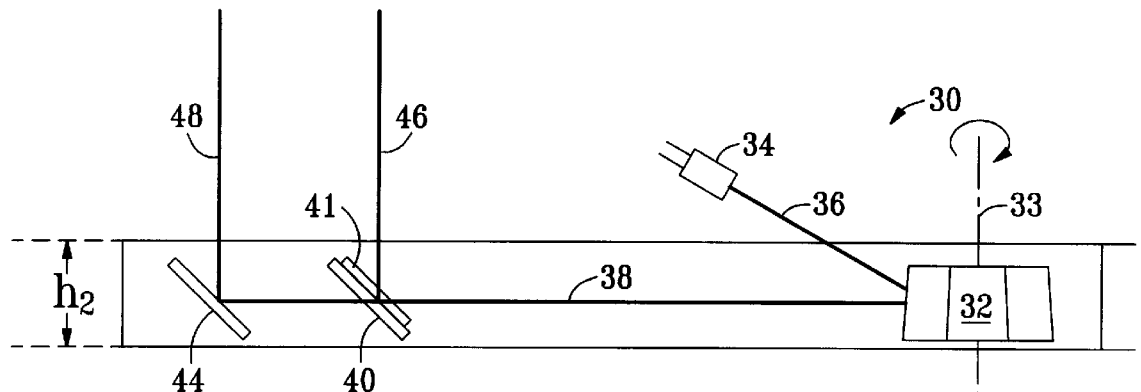
FIG. 2 is a schematic diagram illustrating a scanning system according to a first embodiment of the present invention.

FIG. 2 illustrates a scanning system 30 according to a first embodiment of the present invention. The system 30 includes a facet wheel 32 having two or more facets. A reading beam source 34, illustrated as a laser diode, directs a reading beam 36 onto the facet wheel. In this system 30, the facet wheel 32 has mirror facets arranged at the same tilt angle so that the scanned beams 38 are directed along the same axis toward optical element 40. The optical element 40 is selectively light transmissive or reflective: when reflective the scanned beam 38 is reflected off the element 40 (upward as illustrated in the figure) directing a scan line 46 into the scan volume; when transmissive the scanned beam 38 passes through the element 40 and is reflected by fold mirror 44 directing a scan line 48 in the scan volume.

Figure 1:
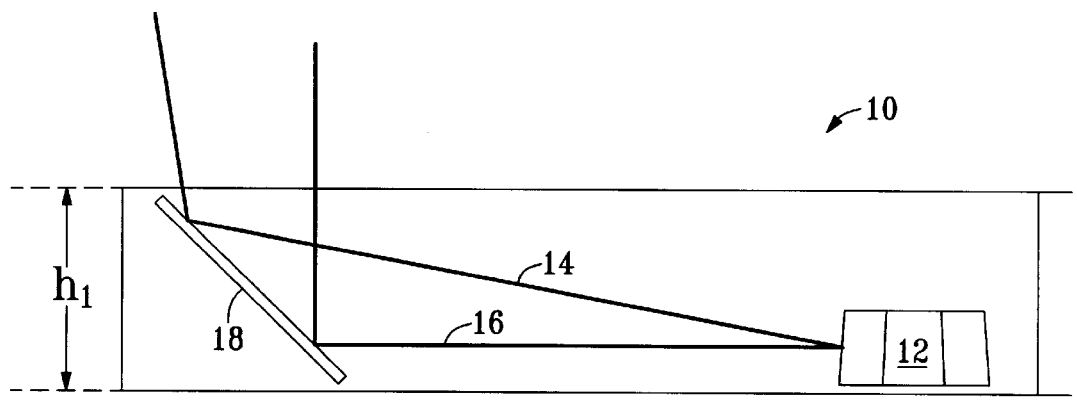
FIG. 1 is a schematic diagram illustrating a conventional scanning system employing a facet wheel.

As compared to the configuration 10 of FIG. 1, the scan system 30 of FIG. 2 achieves a reduced scanner height by utilizing smaller (height) pattern mirror(s) for folding the scanned beam into the scan volume. In a preferred configuration, the scanning mechanism, in this embodiment the facet wheel 32, the transmissive/reflective optical element 40 and the pattern mirror 44 are all disposed such that the beam paths across each element are in the same plane (coplanar). The light source or laser diode 34 may also be disposed in that same plane to minimize height. The laser diode 34 is diagrammatically shown in FIG. 2, but may be positioned such that beam 36 and beam 38 are coplanar with beam 36 oriented perpendicular to the rotational axis 33 of the facet wheel 32.

The optical element 40 comprises a surface polarization element 41, such as an LCD module control surface integral therewith. The LCD module 41, upon a signal from a controller, selectively controls the polarity of light passing therethrough to be either p-polarity or s-polarity. The underlying optical element 40 comprises a polarizing beam splitter, reflecting one polarity (e.g. s-polarity) and transmitting the other polarity. Thus depending upon the setting of the control surface module 41, the light beam 38 is either transmitted to mirror 44 to generate scan beam 48 or reflected to generate scan beam 46. The controller 41 may alternate polarity (and thus select which beam 46/48 is generated) according to alternating facets of the mirror polygon 32, or alternating scans of an oscillating mirror 52 as in FIG. 3 or alternating scans of an oscillating light source 74 as in FIG. 4.

Figure 3:
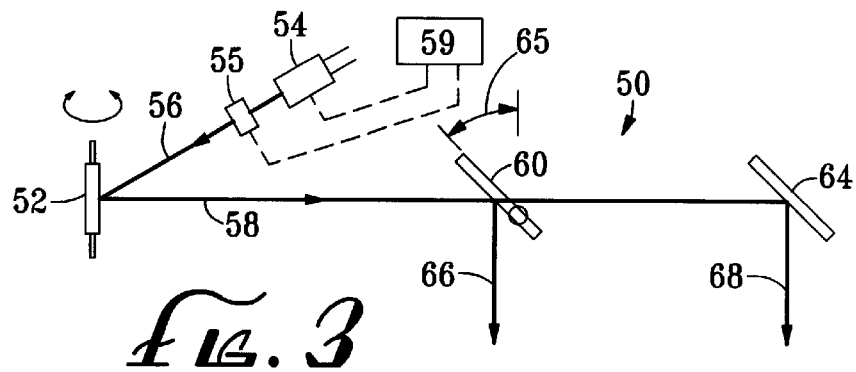
FIG. 3 is a schematic diagram illustrating a scanning system according to a second embodiment of the present invention.

The use of the transmissive/reflective optical element also permits the use of simpler scanning mechanisms such as a dithering mirror or other single motion scan generator to scan or dither the reading beam yet produce multiple parallel scan lines into the scan volume. FIG. 3 illustrates an alternative scanning system 50 employing a dithering mirror 52 as the scanning mechanism. The laser diode 54 generates a reading beam 56 which is directed onto the dithering mirror 52 which produces a scanned beam 58 toward optical element 60. The optical element 60 is selectively light transmissive or reflective: when reflective, the scanned beam 58 is reflected off the element 60 (downward as illustrated in the figure) directing a scan line 66 into the scan volume; when transmissive, the scanned beam 58 passes through the element 60 and is reflected by fold mirror 64 directing a scan line 68 in the scan volume.

There are several methods for controlling the multiple line generation for effective operation of the system the embodiments disclosed herein. For example in FIG. 3, where the light source 54 is a laser diode, the laser light beam 56 generated is polarized. In one configuration, a polarizing control element 55 is positioned upstream of the polarized beam splitting optical element 60. The beam splitting optical element will either be transmissive or reflective of the light beam depending upon the light beam polarity. Connected to the controller 59, the control element 55 selectively changes the polarity of the beam 56 thus allowing the alternate generation of either beam 66 or beam 68. The laser diode 54 and the motor control for the scan mechanism 52 may also be connected to and controlled by controller (e.g. a microcontroller) 59. Thus the system alternately switches between a first mode whereby the beam 58 is reflected by the optical element 60 and a second mode whereby the beam is transmitted through the optical element 60.

The control module 55 may be positioned at a variety of locations between the laser diode 54 and the optical element 60. Positioning the control module 55 upstream of the scanning mirror 52 enables the size of the element to be minimized since the beam 56 at that position is not being scanned. The control module may be configured integral with the diode 54 or integral with the scanning mirror 52. If positioned between the optical element 60 and the scanning mirror 52, the control module would need be larger since the beam downstream of the scanning mirror 52 is being scanned. Alternately, the control module may be formed integral with the optical element 60, such as forming LCD module on the surface of the optical element 60 which when controlled by the controller 59, changing the polarity of the LCD module to control the polarity of the light passing through which then, depending upon the polarity is either reflected or transmitted by the optical element 60.

Where the light source 54 is a laser diode, the generated beam 56 is already polarized and readily controllable by the polarity controls described. Where the light source 54 does not produce a polarized beam, a polarizing filter, such as at controller 55, would be provided.

By alternating the scan lines as described above, only a single return signal is produced thus the detector (such as detector 89 in FIG. 5) need not distinguish multiple signals.

In alternate embodiments, the controller 55 may be eliminated and the optical element may comprise a simple light beam splitter dividing the reading beam 58 into two beams 66, 68 produced simultaneously. Because in a system where two signals are simultaneously produced, there is a potential for noise problems because each of the beams 66, 68 will strike the object being scanned.

In a first simultaneous beam embodiment, the system optics may be designed to produce sufficiently separated focal positions for the two beams 66, 68 within the scan volume, i.e. to focus beams 66, 68 at different distances. If the bar code being scanned is positioned near the focal point of beam 66, the return signal from that beam is focused to a small spot, i.e., high intensity, and such light reflecting off the bar code is a high level carrier signal. At the same time, light from the other beam 68 strikes the bar code positioned near beam 66 focal point and far away from the beam 68 focal point, so the beam 68 light is fairly broad illumination and light reflected acts as a low level carrier signal which may be easily subtracted (or otherwise ignored) out by the signal processing electronics. The reverse is also true in looking at a bar code located near a focal point for beam 68.

In another simultaneous beam embodiment, multiple detectors may be provided, a first detector for detecting return signal from beam 66 and a second detector for detecting return signal from beam 68. Multiple beam collecting and processing schemes are set forth in U.S. Pat. No. 5,705,802 herein incorporated by reference.

Figure 4:
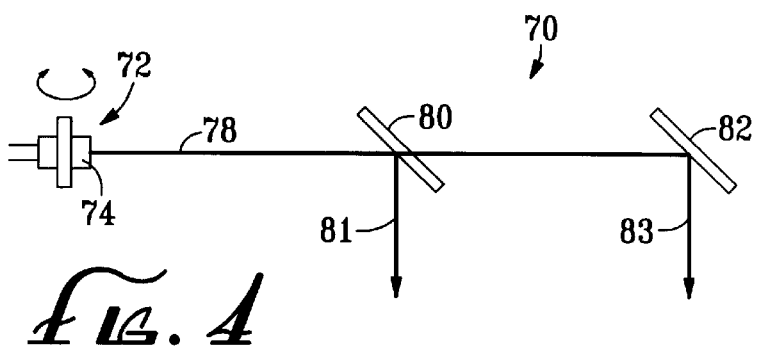
FIG. 4 is a schematic diagram illustrating a scanning system according to a third embodiment of the present invention.

FIG. 4 illustrates another alternative scanning system 70 whereby the laser diode 74 itself is moved to comprise its scanning mechanism 72. Such a scanning mechanism is described in U.S. Pat. No. 5,629,510 herein incorporated by reference. The laser diode scanning mechanism 72 produces a scanned beam 78 toward optical element 80. The optical element 80 is selectively light transmissive or reflective: when reflective the scanned beam 78 is reflected off the element 80 (downward as illustrated in the figure) directing a scan line 81 into the scan volume; when the optical element 80 is light transmissive the scanned beam 78 passes through the element 60 and is reflected by fold mirror 82 directing a scan line 83 into the scan volume.

Figure 5:
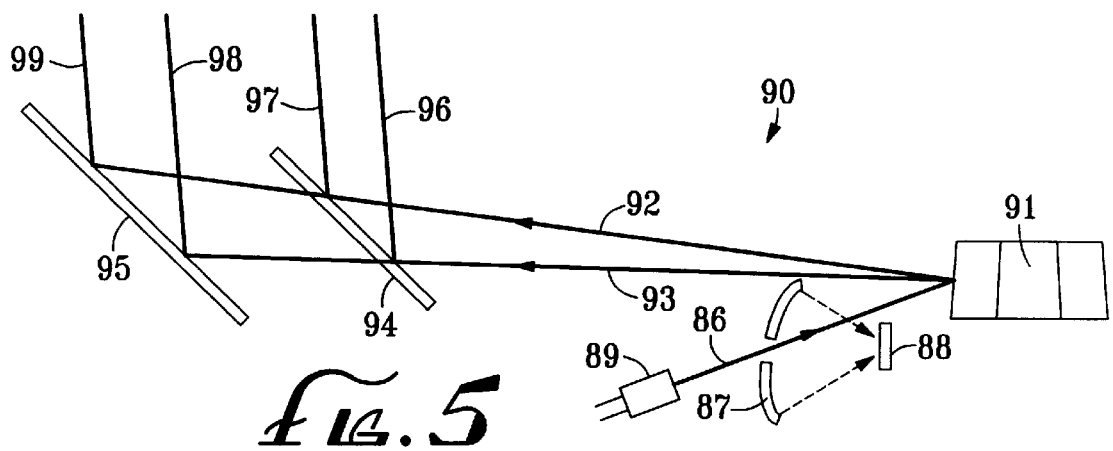
FIG. 5 is a schematic diagram illustrating a scanning system according to a fourth embodiment of the present invention.

These embodiments may be combined to create additional scan lines. FIG. 5 illustrates a system 90 having a facet wheel 91 for the scanning mechanism generating multiple scanned beams 92, 93. A beam source such as a laser diode 89 directs a light beam 86 which passes through an opening in collection mirror 87 and then impinges onto the facet wheel 91. The facet wheel 91 has multiple facets arranged (in this embodiment). at two angles generating multiple scanned beams 92, 93 at different angles onto optical element 94. The optical element 94 is selectively light transmissive or reflective: when reflective the scanned beams 92, 93 are reflected off the element 94 (upward as illustrated in the figure) directing a scan lines 96, 97 into the scan volume; when the optical element 94 is light transmissive the scanned beams 92, 93 pass through the element 94 and are reflected by fold mirror 95 directing scan lines 98, 99 into the scan volume. Collection in this system or in any of the other systems illustrated may be retrodirective or non-retrodirective. FIG. 5 illustrates a retrodirective system where the return signal reflected or scattered off the target returns along the same path to the facet wheel 91 where it is collected/focused by a collection mirror 87 onto detector 88.

If an LCD system such as the system 30 of FIG. 2 is employed as a retrodirective system, the LCD panel 40 causes a 50% loss in return signal power because the return signal is non-polarized and thus reflects only half the return signal 46 and transmits only half the return signal 48.

In order to avoid signal loss, the system may be configured as a non-retrodirective system such as described in U.S. Pat. No. 5,475,206 or U.S. Ser. No. 08/934,487 and Ser. No. 08/942,399 herein incorporated by reference.

Figure 6:
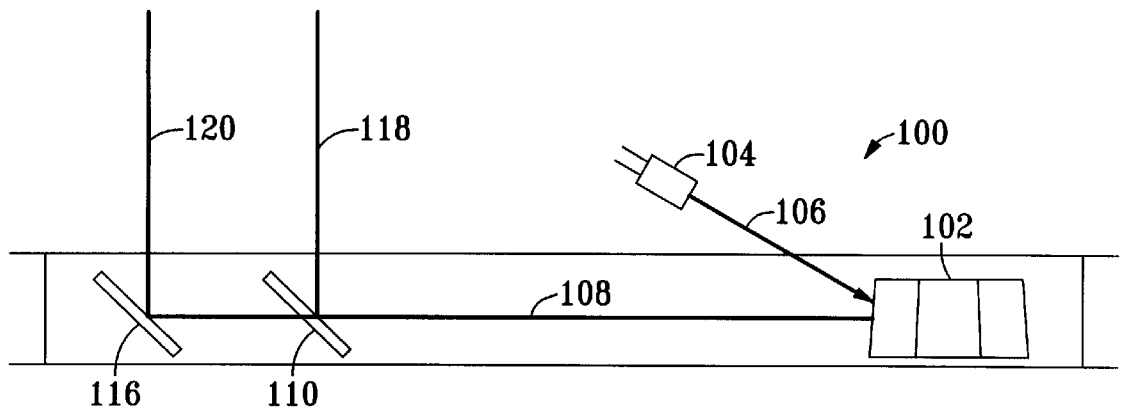
FIG. 6 is a schematic diagram illustrating a scanning system according to a fifth embodiment.
Figure 7:
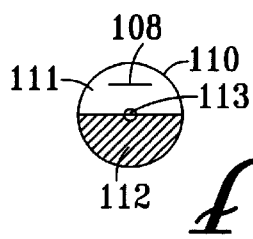
FIG. 7 is a detailed view of an alternate beam splitting mechanism of FIG. 6.

FIGS. 6 and 7 illustrate an optical system 100 which may be employed as a retrodirective system yet avoid return signal loss. A light source 104 (e.g. laser diode, LED, etc.) generates a reading beam 106 onto scanning mechanism 102 in this example shown as a rotating polygon mirror. The scanning mechanism 102 produces scanning beams 108 onto optical element 110. The element 110 includes multiple regions, in this embodiment a first region 111 which is transmissive and a second region 112 which is reflective. The element is either rotatably movable (about axis 113) or axially movable so as to selectively position either the first or second region 111,112 in the path of the scanning beams 108. When the second region 112 is positioned in the path, the beams 108 are reflected along path 118 and into the scan volume. When the first region 111 is positioned in the path, the beams pass through and are then reflected by fold mirror 116 along path 120 and into the scan volume. The scan paths 118 and 120 are desirably parallel into the scan volume.

Figure 8:
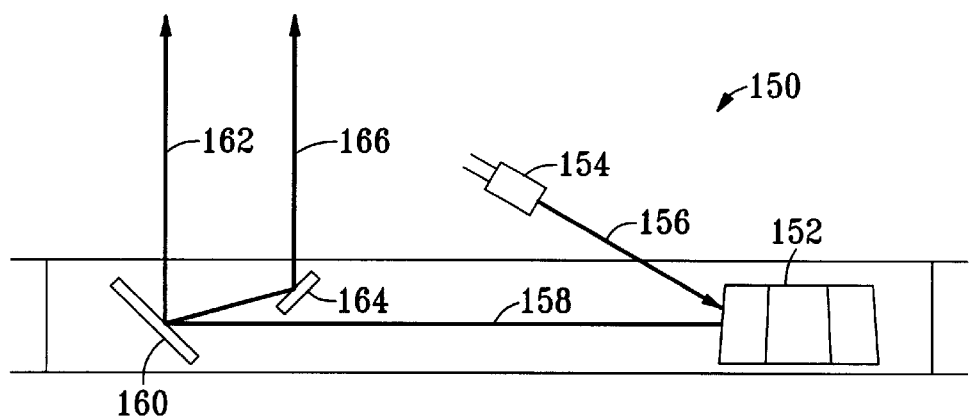
FIG. 8 is a schematic diagram illustrating a scanning system according to a sixth embodiment.

Alternately, FIG. 8 illustrates another system 150 which may produce parallel (or non parallel) scan lines into the scan volume. A light source 154 (e.g. laser diode, LED, etc.) generates a reading beam 156 onto scanning mechanism 152 in this example shown as a rotating polygon mirror. The scanning mechanism 152 produces scanning beams 158 onto optical element 160. The element 160 comprises a micro-mirror or digital light processor (DLP) system having reflective regions which are controllable to change the angle of reflection off the element. In this manner, the angle of reflection of the scan beams 158 may be controlled such that the scan paths 162, 166 are produced, the first path 162 being directly into the scan volume and the second 166 reflecting toward a fold mirror 164. The beam paths 162 and 166 may be desirably directed parallel into the scan volume and yet achieve a thin and compact configuration.

The above configurations may apply to a configuration for a compact scanner such as the PSC handheld single line scanner such as the PowerScan™ scanner but producing parallel scan lines, or a thin multi-line scanners such as the PSC VS1000™ scanner or the PSC Duet™ scanner.

Alternate methods may be employed to provide for alternating between transmitting the beam through the control element and reflecting the beam off the optical element as in any of the previous embodiments. For example, referring to the system 50 of FIG. 3, the characteristics of the beam 58 may be changed between a first state and a second state (e.g. changing the beam polarity) whereby in the first state the beam 58 is reflected by the optical element and in the second state the beam 58 is transmitted through optical element 60 and reflects off mirror 68.

Another method may comprise changing the wavelength of the beam 58 between a first wavelength and a second wavelength, such as by a controller located within the laser diode 54. The optical element 60 may comprise a band pass filter element being reflective to the beam at the first wavelength and transmissive to the beam at the second wavelength.

Thus by either changing beam characteristics of the beam 58 or optical characteristics of the optical element 60, the system 50 selectively renders the optical element reflective or transmissive.

Another method may comprise rotation of the optical element 60 between a first position, for example about 450 to vertical as shown in FIG. 3, to a vertical position shown by the arrow 65. In this embodiment, the beam 58 and optical element 60 are selected such that (1) the beam 58 is reflected generating scan line 66 when the optical element 60 is angled at 45° to the beam 58 and (2) the beam passes through the optical element 60 when the optical element 60 is oriented vertically (i.e. the incident angle of the beam 58 is 90° to the optical element 60). This method may be accomplished with a standard dielectric coating that transmits one range of wavelengths and reflects another range of wavelengths. The wavelength range is dependent on the angle of incidence of the beam. By changing the angle of incidence, the transition wavelength between reflection and transmission will move across the spectrum. The beam wavelength does not change, but the transmission characteristics of the dielectric coating changes for the beam wavelength as the angle changes.

Figure 9:
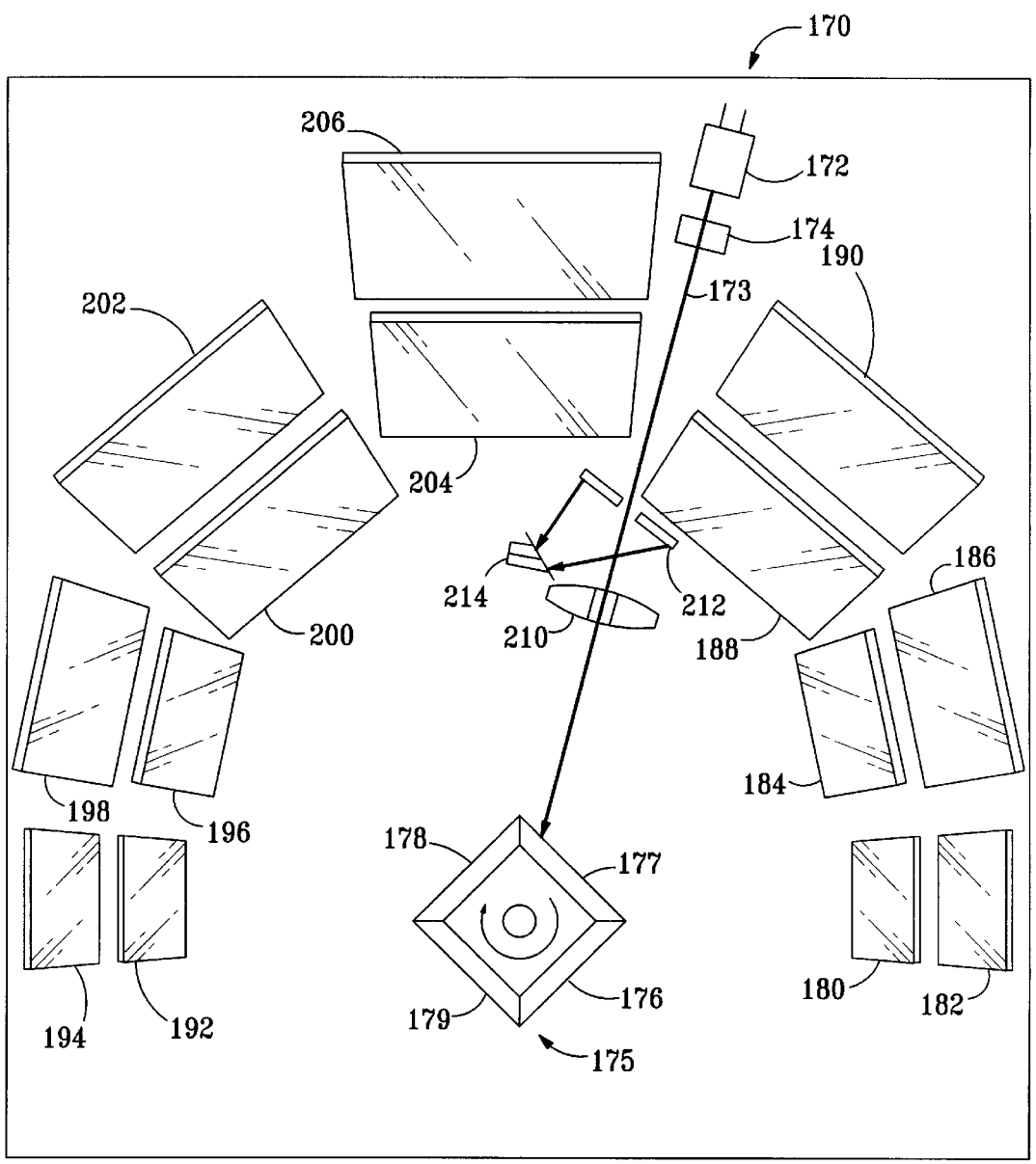
FIG. 9 is a schematic view of a multi-line scanner according to a seventh embodiment.

FIG. 9 illustrates a multi-line scanner 170 which may employ the optical pair configuration of any of the previous embodiments. The scanner 170 may comprise an in-counter (horizontal) scanner or a vertically mounted scanner. The scanner 170 includes a semicircular arrangement of mirrors 180–206 disposed about the facet wheel 175. Additional mirrors of similar configuration may be provided to encircle the polygon mirror 175. In such a configuration, it may be desirable to employ a second reading beam (such as from a second light source) directed to the opposite side of the polygon mirror such as described in U.S. Pat. No. 5,705,802 incorporated by reference.

The light source 172 such as a laser diode produces a laser beam 173 passing through a control module 174 and through apertures in mirror 212 and collection lens 210. The scanner 170 has seven optical pairs 192/194, 196/198, 200/202, 204/206, 188/190, 184/186 and 180/182. Each optical pair comprises a pattern mirror and an optical element as in one of the previous embodiments. For example, optical pair 192/194 includes a pattern mirror 194 and an optical element 192 arranged in series, the pattern mirror 194 be disposed in line behind/downstream of the optical element 192. The pattern mirror 194 and the optical element 192 are arranged at about 45° from horizontal (the plane of the page). As the beam 173 is scanned across the optical element 192 by one of the facets of the facet wheel 175, the scan beam is either (1) reflected by the element 192 forming a scan line into the scan volume or (2) allowed to be transmitted through the optical element 192 to the pattern mirror 194 forming a second scan line into the scan volume. By arranging the elements 192, 194 in parallel planes one behind the other parallel scan lines are produced. Geometrically, the elements 192, 194 may be arranged as opposite ends of a parallel-epiped. It may be desirable that the pattern mirror 194 be larger (i.e. wider) than the optical element since it is downstream of the optical element 192 and thus may accommodate a longer scan line. Each of the optical pairs may operate in a like manner.

Though in the scanner 170 of FIG. 9 and the earlier embodiments, only illustrate a single reflection off the pattern mirror 194, the system may include additional pattern mirrors such that the first scan line or set of scan lines is produced by first reflecting off the first pattern mirror 194 (the primary mirror) and then off secondary mirror(s). Such pattern mirror pair configuration, each scan line reflecting off two pattern mirrors, is described in U.S. Pat. No. 5,705,802 incorporated by reference.

The facet wheel 175 provides a convenient mechanism for controlling the transmissive/reflective property function of the optical element such as element 192. In a first embodiment, the beam 173 is polarized, the surface of one or more facets (e.g. facets 176, 178) include a reflective optical which merely reflects the beam 173 without changing its polarity (for example the beam remains s-polarity). The optical elements 192, 196, 200, 204, 188, 184, 180 are polarized beam splitters. When the s-polarity beam is scanned across the optical element 192, the s-polarity beam is reflected optical element 192 producing a first scan line into the scan volume. The other facets 177, 179 include an optical surface which rotates the polarity of the beam 90°, changing it to p-polarity. When the p-polarity is scanned across the optical element 192, it passes through the element 192 scanning across the pattern mirror 194 where it is reflected forming a second scan line into the scan volume. Each of the other optical pairs operates in similar fashion. This configuration advantageously requires no controller 174 to actively change the beam polarity.

Whether or not the beam 173 is polarized, the facets may include polarization surfaces, for example the facets 176, 178 may alternately produce s-polarity beam upon reflection with the facets 177, 179 producing p-polarity beam upon reflection.

Return signal from the target is preferably collected retrodirectively, reflecting off the facet wheel 175, focused by collection lens 210, then reflected off collection mirror 212 and onto the detector 214. Other suitable collection schemes may be employed such as a collection mirror system as in FIG. 5 or U.S. Pat. No. 5,202,784 herein incorporated by reference or other non-retrodirective collection systems such as described in U.S. Pat. No. 5,475,206 or U.S. Ser. No. 08/934,487 and Ser. No. 08/942,399 incorporated by reference.

Thus the present invention has been set forth in the form of its preferred embodiments. It is nevertheless intended that modifications to the disclosed scanning systems may be made by those skilled in the art without altering the essential inventive concepts set forth herein.

What is claimed is:

1. A method of scanning an item in a scan volume, comprising the steps of
   generating a laser light beam from a light source;
   scanning the light beam over a scan angle to generate a scan beam along an outgoing path;
   generating a first scan line and a second scan line by positioning a first pattern mirror in the
   outgoing path of the scan beam,
      positioning an optical element in the outgoing path of the scan beam upstream of the first pattern mirror,
      scanning the light beam across the optical element and reflecting the scan beam off the optical element to generate the first scan line and directing the first scan line into the scan volume,
      passing the scan beam through the optical element and then across the first pattern mirror and reflecting the scan beam off the first pattern mirror to generate the second scan line and directing the second scan line into the scan volume.

2. A method according to claim 1 wherein the step of scanning the light beam over a scan angle comprises
   positioning a scanning mirror downstream of the light source, directing the light beam onto the scanning mirror, and moving the scanning mirror to scan the light beam.

3. A method according to claim 2 further comprising dithering the scanning mirror over a scan angle.

4. A method according to claim 2 wherein the scanning mirror comprises a rotating facet wheel.

5. A method according to claim 4 further comprising
   providing the facet wheel with at least first and second facets;
   providing the first facet with a polarizing surface by which the scan beam is polarized in a first direction such that it passes through the optical element;
   reflecting the scan beam off the second facet polarized in a second direction such that it reflects off the optical element.

6. A method according to claim 1 further comprising
   generating the light beam with a laser diode and wherein the step of scanning the light beam over a scan angle comprises pivoting the laser diode.

7. A method according to claim 1 further comprising
   forming the optical element as partially transmissive and partially reflective and splitting the beam into first and second beam portions with the optical element;
   reflecting the first beam portion off the optical element to generate the first scan line;
   passing the second beam portion through the optical element and then reflecting the second beam portion off the first pattern mirror to generate the second scan line.

8. A method according to claim 7 further comprising
   simultaneously directing the first scan line and the second scan line into the scan volume and scanning a target.

9. A method according to claim 8 further comprising
   splitting return light reflecting off the target into light components, directing light component originating from the first beam portion onto a first detector and directing light component originating from the second beam portion onto a second detector.

10. A method according to claim 8 further comprising
    alternately producing the first scan line and the second scan line.

11. A method according to claim 1 further comprising
    forming the optical element as partially transmissive and partially reflective, wherein the optical element reflects light of a first polarity and passes light of a second polarity;
    controlling polarity of the light beam to switch polarity of the light beam from the first polarity to the second polarity;
    selectively (1) switching polarity of the light beam to the first polarity whereby the light beam is reflected by the optical element thereby generating the first scan line and (2) switching polarity of the light beam to the second polarity whereby the light beam is transmitted through the optical element thereby generating the second scan line.

12. A method according to claim 1 further comprising
    alternately generating the first and second scan lines by controlling the optical element to be alternately transmissive and reflective.

13. A method according to claim 1 wherein the optical element comprises a rotating element having a reflective section and a transmissive section, the method further comprising
    selectively (1) positioning the reflective section in the outgoing path to reflect the scan beam and form the first scan line and (2) positioning the transmissive section in the outgoing light path to allow the scan beam to pass through the optical element and reach the pattern mirror to produce the second scan line.

14. A method according to claim 1 further comprising
    positioning a scanning mirror in the outgoing path;
    arranging a plurality of optical pairs in a pattern about the scanning mirror, each optical pair comprising the first pattern mirror and the optical element.

15. A method according to claim 1 further comprising
    controlling beam characteristic of the light beam between a first state and a second state;
    forming the optical element as selectively transmissive and reflective, wherein the optical element reflects the light beam in the first state and passes light beam in the second state;

selectively (1) switching the light beam to the state whereby the light beam is reflected by the optical element thereby generating the first scan line and (2) switching the light beam to the second state whereby the light beam is transmitted through the optical element thereby generating the second scan line.

16. A scanning method comprising the steps of generating a laser light beam from a light source;

arranging the laser light beam with a given polarity in a first direction;

scanning the light over a scan angle with a scanning mirror to produce a scan beam;

arranging a plurality of optical pairs in a pattern about the scanning mirror, each optical pair comprising a first pattern mirror and an optical element;

generating a first scan line and a second scan line by
positioning a first pattern mirror in the outgoing path of the scan beam,
positioning an optical element in the outgoing path of the scan beam upstream of the first pattern mirror,
scanning the light beam across the optical element and reflecting a first portion of the scan beam off the optical element to generate the first scan line and directing the first scan line into the scan volume,
allowing a second portion of the scan beam to pass through the optical element and scan across the first pattern mirror and reflecting the second portion of the scan beam off the first pattern mirror to generate the second scan line and directing the second scan line into the scan volume.

17. A method according to claim 16 further comprising arranging the first pattern mirror in a plane parallel to a plane of the optical element and producing the first and second scan lines in parallel.

18. A method according to claim 16 further comprising alternately producing the first scan line and the second scan line.

19. A scanning system comprising a light source producing a light beam;

a scanning mechanism for scanning the light beam over a scan angle to produce a scan beam along an outgoing path;

a first pattern mirror positioned in the outgoing path of the scan beam, the first pattern mirror reflecting the scan beam and directing it toward the scan volume to produce at least a first scan line;

an optical element disposed in the outgoing path between the scanning mechanism and the first pattern mirror, wherein reflectivity of the optical element is selectively changeable between a first mode to direct the scan beam in a first direction onto the first pattern mirror and form a first scan line and a second mode to direct the beam in a second direction to form a second scan line.

20. A scanning system according to claim 19 wherein the system selectively renders the scan beam reflective by and/or transmissive through the optical element.

21. A scanning system according to claim 19 further comprising a controller for selectively changing polarity of the light beam, wherein the optical element comprises a polarized beam splitter reflective of light of a first polarity and transmissive of light in the other polarity.

22. A scanning system according to claim 19 wherein the optical element has reflective regions which are controllable to change the angle of reflection of the scan beam off the element, wherein the optical element is selectively controlled to reflect the scan beam on a first path to form the first scan line and along a second path to the first pattern mirror to form the second scan line.

* * * * *